Jan. 6, 1942.   E. G. BAILEY   2,268,559
STEAM BOILER
Filed July 15, 1938   10 Sheets-Sheet 1

INVENTOR.
Ervin G. Bailey
ATTORNEY.

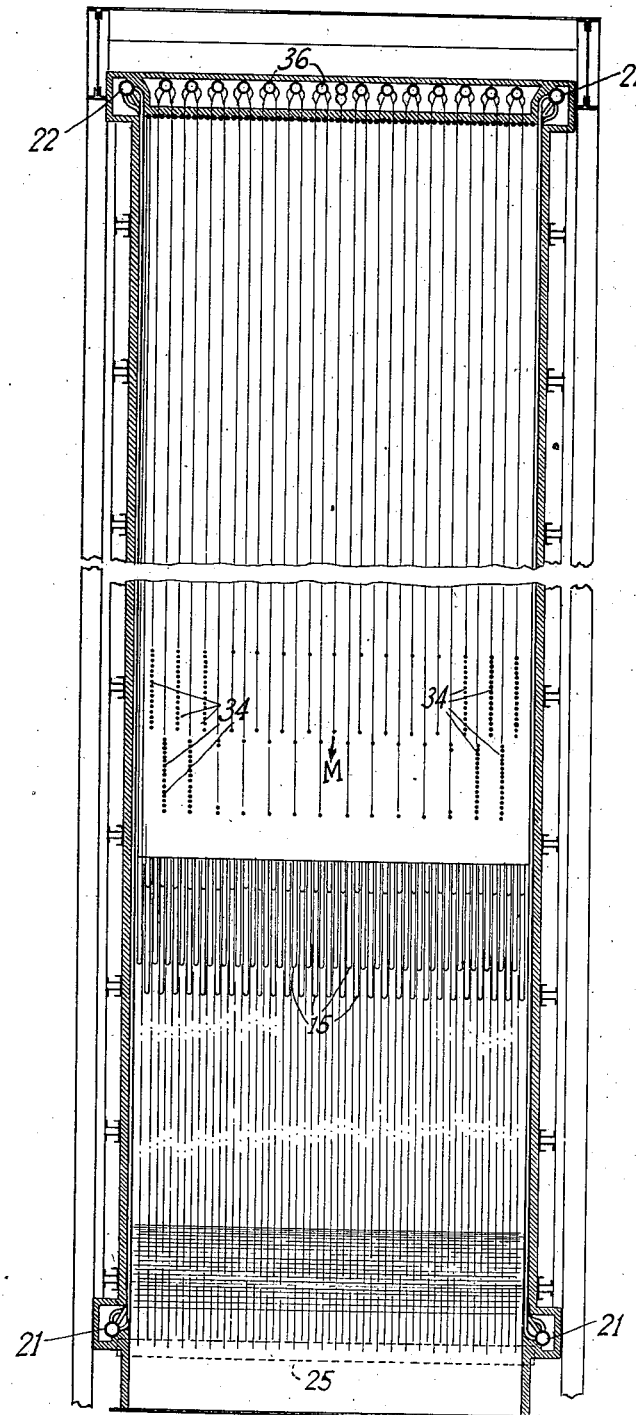

Jan. 6, 1942.  E. G. BAILEY  2,268,559
STEAM BOILER
Filed July 15, 1938  10 Sheets-Sheet 3
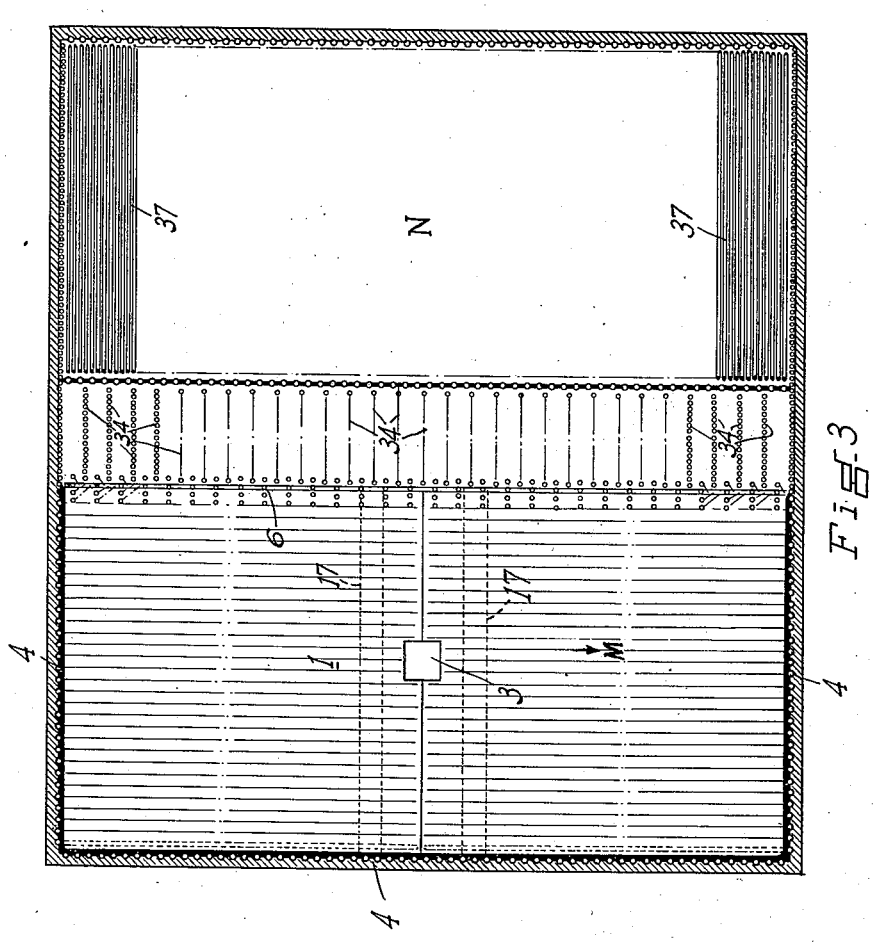
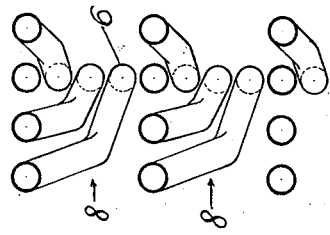
INVENTOR.
Ervin G. Bailey
BY
ATTORNEY.

Jan. 6, 1942.   E. G. BAILEY   2,268,559
STEAM BOILER
Filed July 15, 1938    10 Sheets-Sheet 4

INVENTOR.
Ervin G. Bailey
BY
ATTORNEY.

Jan. 6, 1942.  E. G. BAILEY  2,268,559
STEAM BOILER
Filed July 15, 1938  10 Sheets-Sheet 7

Fig-8ª

INVENTOR.
Ervin G. Bailey
BY
ATTORNEY.

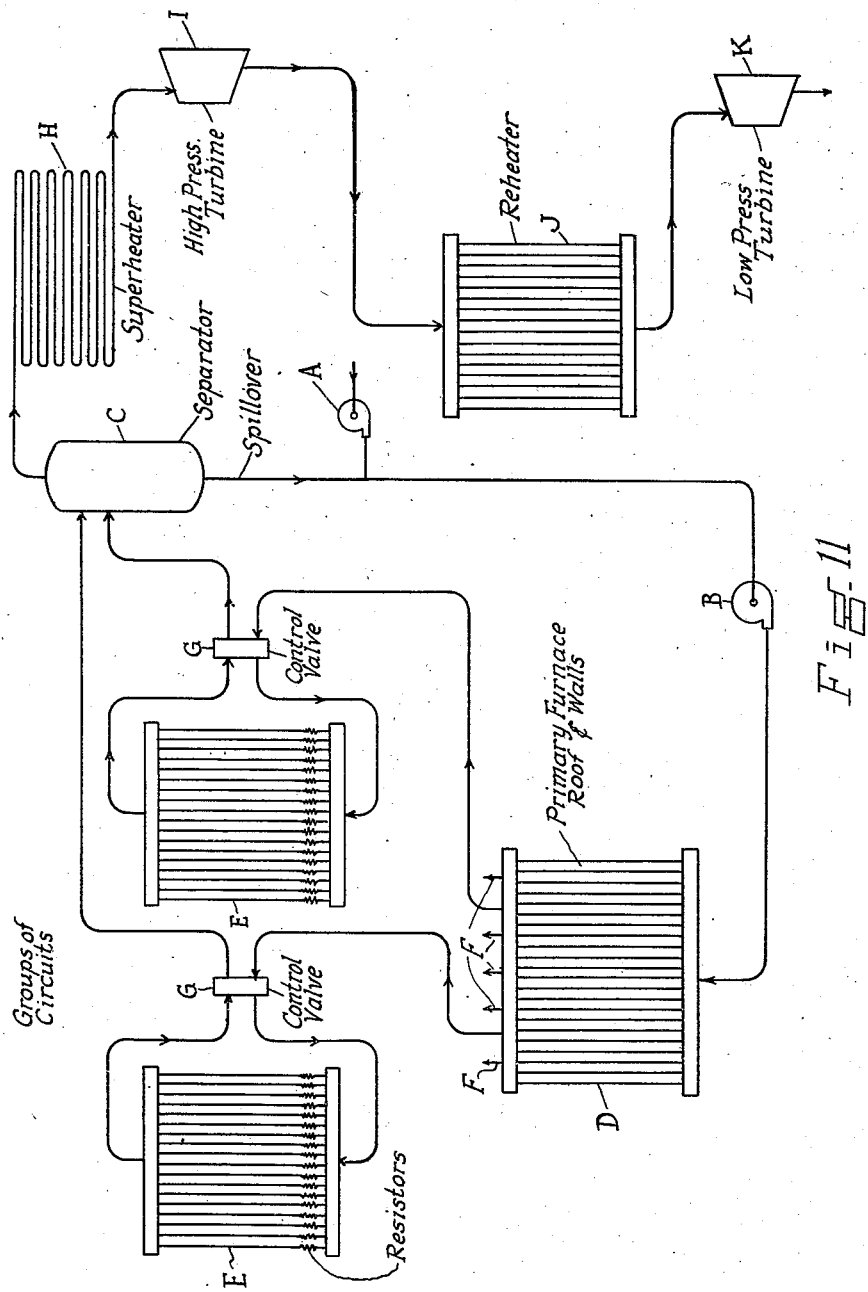

Patented Jan. 6, 1942

2,268,559

UNITED STATES PATENT OFFICE 2,268,559

STEAM BOILER

Ervin G. Bailey, Easton, Pa., assignor to The Babcock & Wilcox Company, Newark, N. J., a corporation of New Jersey Application July 15, 1938, Serial No. 219,315

16 Claims. (Cl. 122—235)

This invention is a furnace and high pressure steam boiler of large capacity for high superheat temperature, utilizing tubes of small cross-section area for better heat transfer per unit of area of external surface and necessarily closely spaced.

With boilers of this character in which the furnace must function at a high rate of heat release in B. t. u. per hour per cubic foot of furnace volume, attainment of the heat transfer necessary to secure the desired high superheat temperature requires gas temperatures close to the slagging point of the ash of the pulverized fuel with which the furnace is fired and this coupled with the close spacing of the small tubes results in the convection surface becoming quickly fouled with slag unless some method is used to remove slag in advance of the convection surface.

In lieu of the customary slag screens consisting of spaced convection tubes transverse of the gas flow path, the present invention solves the problem more effectively by the combination of a water cooled slag tap furnace with a downflow gas pass of considerable length, unobstructed by cross tubes, and into the upper end of which the slag tap furnace directly discharges the products of combustion which carry with them gas borne slag particles. The fluid cooled walls of the long downflow gas pass receive a large portion of the slag particles and cool them to a sticky film capable of receiving and retaining other slag particles in much the same manner that sticky fly paper catches dust. Operation of the boiler is controlled to produce the proper stickiness of the slag rather than a free flowing condition in this long downflow pass.

The invention also particularly distinguishes from previous boiler furnace combinations of similar size and character in that the fluid cooled slag tap furnace and adjacent long fluid cooled down-pass for the gases may be combined with an enlarged turning zone for the gases in advance of the convection tube banks, whereby gas borne slag particles failing to adhere to the previously mentioned sticky surface and moving in the same direction as the gases of combustion are progressively cooled to solidified particles which then are separated out not only by gravity and fall from the stream in the large gas turning zone, but also are assisted in separation by reason of lessened turning velocity and reversal of the direction of gas flow; thus separation of non-gaseous elements results to such an extent that substantially clean gases only contact the convection tube banks, consequently, the desired efficiency of heat transfer is continuously maintained, whereas in other types, having upwardly flowing gases, the gas borne slag particles have a tendency to be carried into the convection surface where they are deposited, or may remain fluid or be remelted after solidifying on heat transfer surfaces thus decreasing the efficiency.

With this arrangement of furnace herein described there is also the feature that quenched slag is in an elevated position and need not be pumped, but may be directly discharged to a car, sluice or other disposal means, thus saving the cost of handling to a large extent.

In the appended drawings several forms which the invention may take in practice are illustrated diagrammatically.

In these drawings:

Fig. 1 is a sectional side elevation indicating a preferred form of furnace, gas pass and heat absorbing surface arrangement of a steam boiler according to the present invention.

Fig. 1$^a$ is a sectional view on the line 1$^a$—1$^a$ of Fig. 1.

Fig. 2 is a sectional front elevation of the boiler of Fig. 1 on the plane of the line 2—2 of Fig. 1.

Fig. 3 is a sectional plan view of the boiler of Fig. 1 on the plane of line 3—3.

Figure 8:
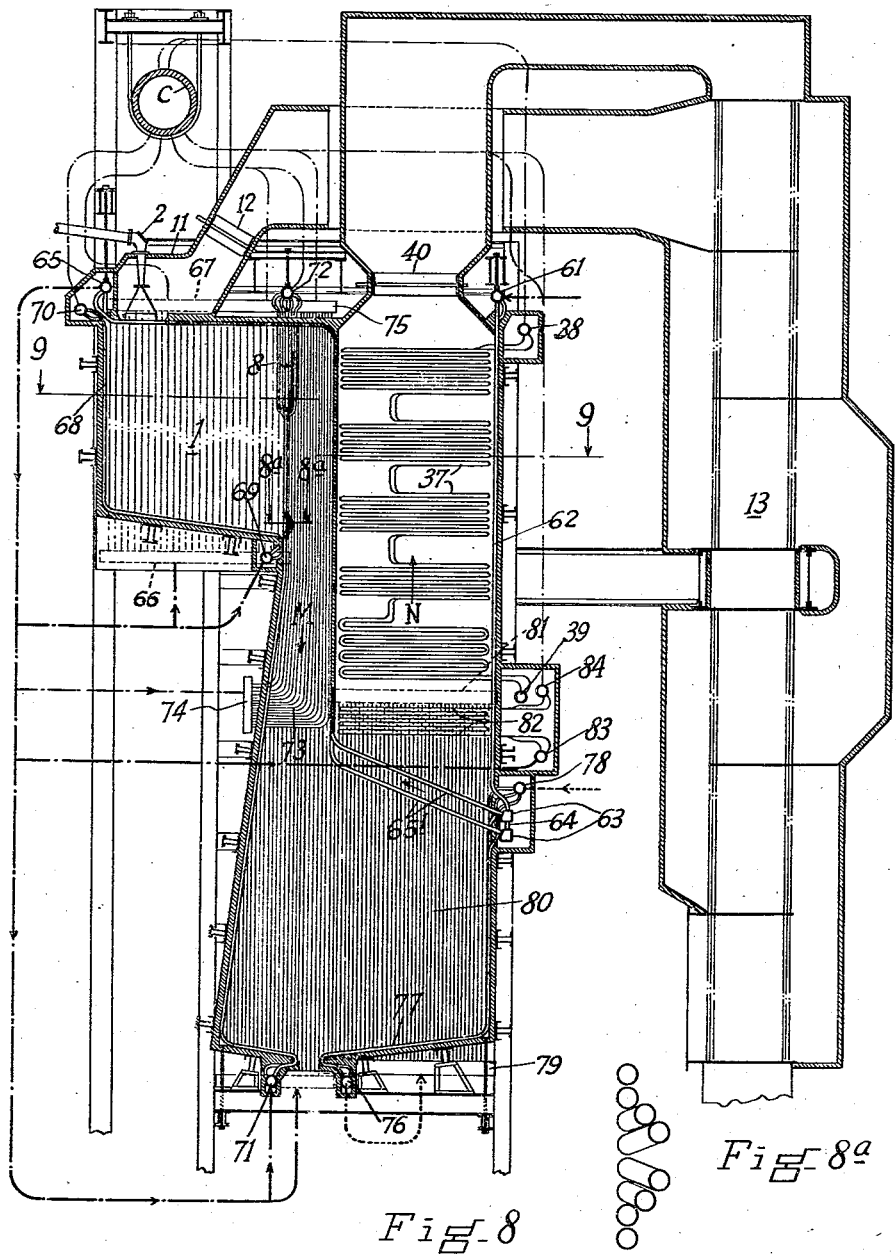
Fig. 8 is a sectional side elevation of another modified boiler arrangement according to the present invention.

Fig. 8$^a$ is a horizontal section on the line 8$^a$—8$^a$ of Fig. 8.

Figure 9:
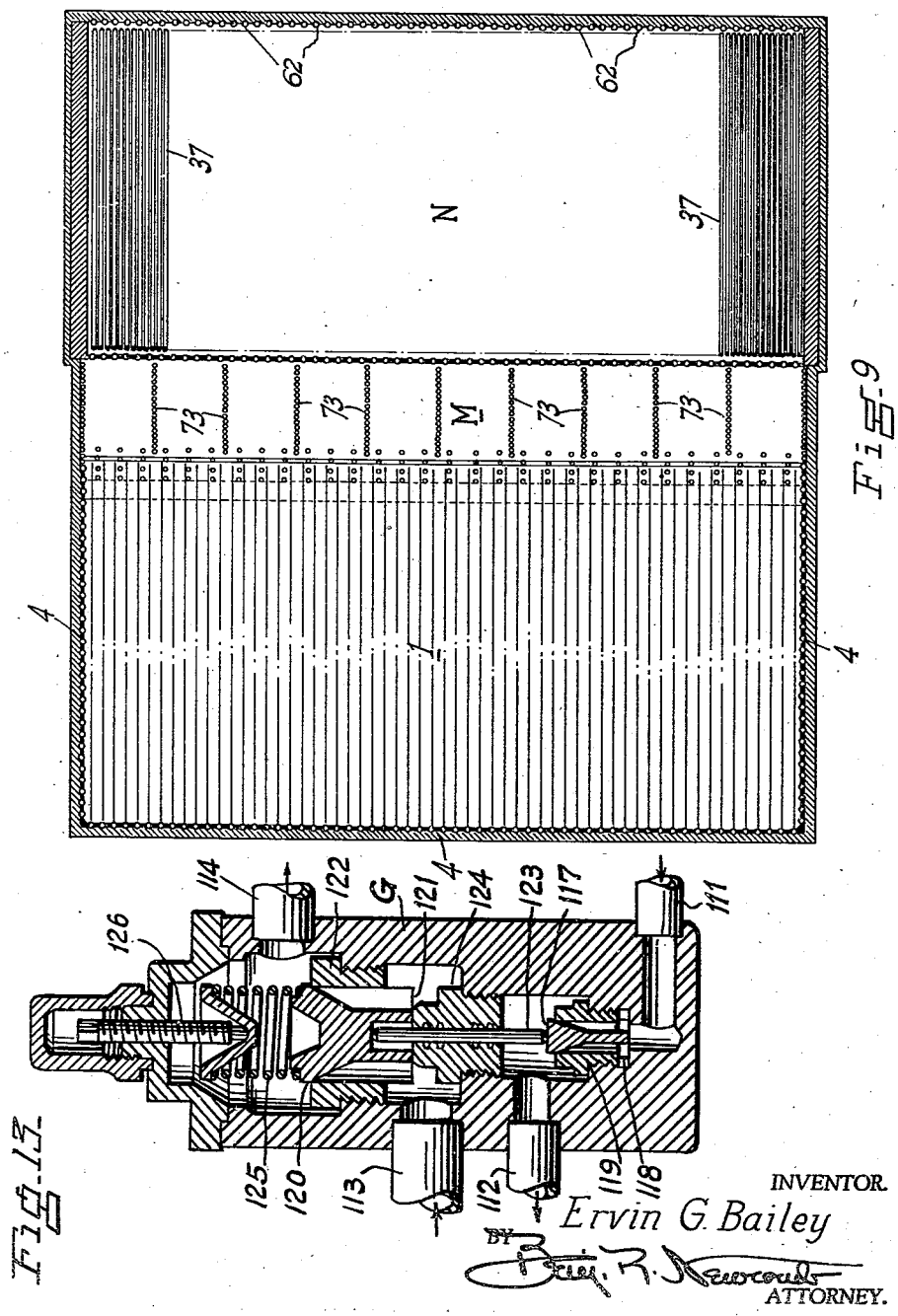

Fig. 9 is a sectional plan view of the boiler of Fig. 8 on the plane of line 9—9 of Fig. 8.

Figure 10:
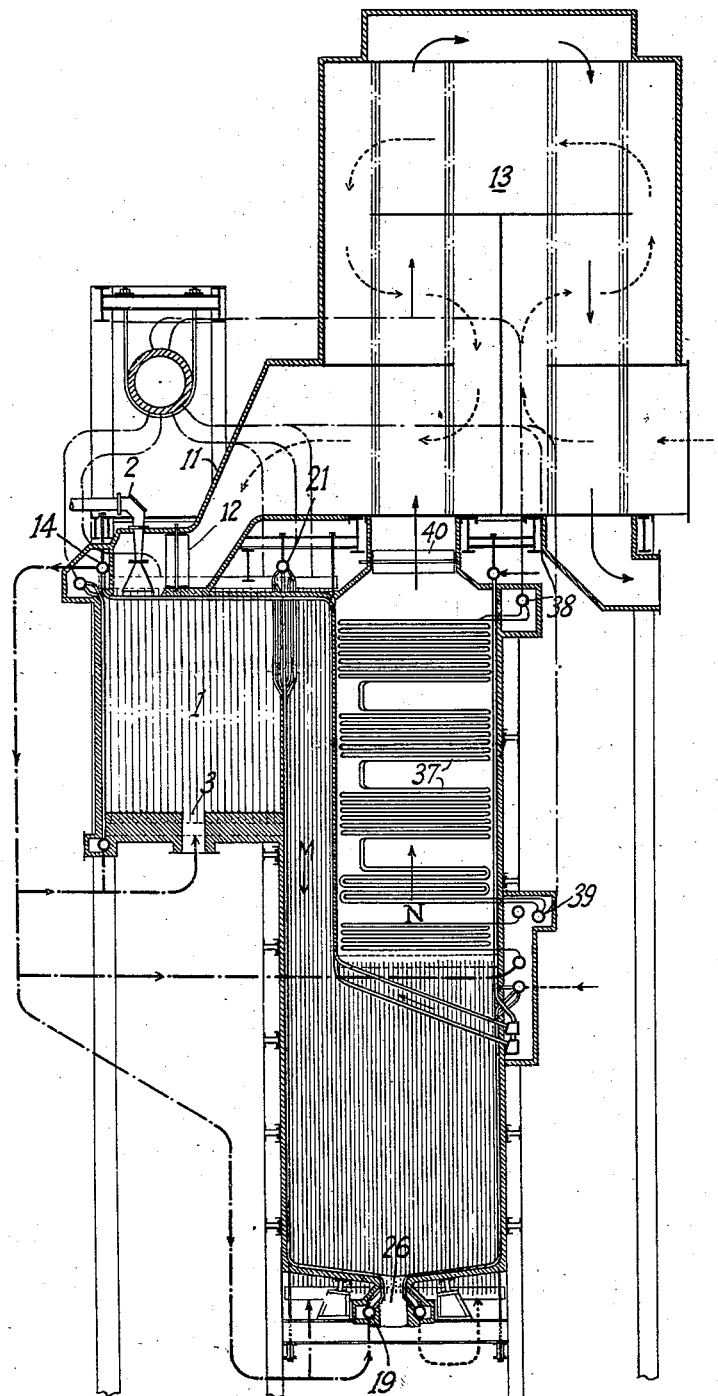

Fig. 10 is a sectional side elevation of a still further form of boiler arrangement according to the present invention.

Fig. 11 is a schematic fluid flow diagram substantially typical of all of the boiler arrangements of the preceding figures of the drawings.

Fig. 12 indicates the manner in which the tubes are displaced in Figs. 3 and 9.

Fig. 13 is a sectional elevation of a suitable control valve.

Figures 1, 1A:
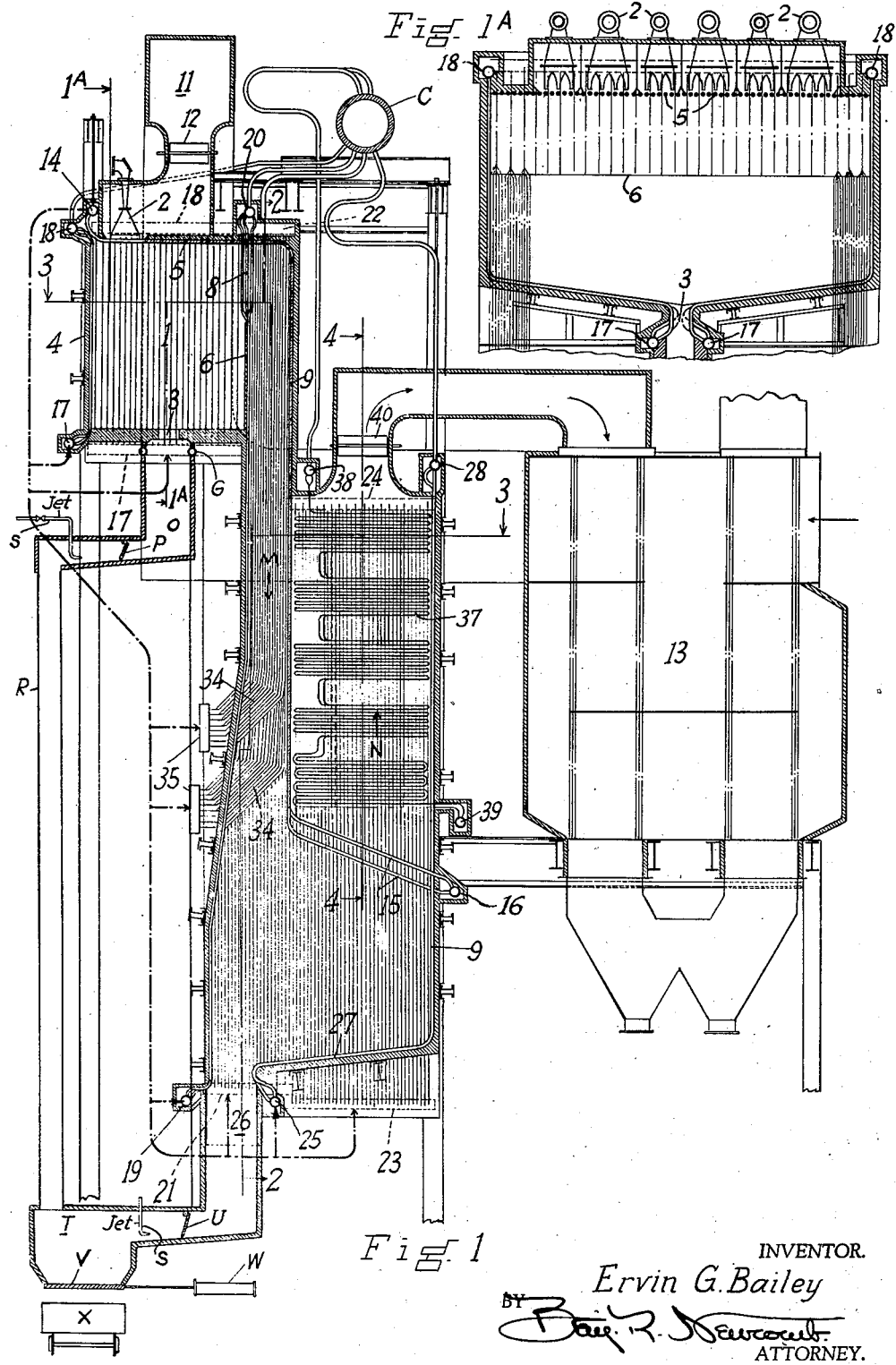

Referring particularly to the steam boiler illustrated in Fig. 1 there are set forth certain features which are common to all forms herein illustrated, such, for instance, as the furnace 1 which is top fired, with an upper side wall outlet for the gases of combustion, fluid cooled walls, bottom slag tap opening 3 and pulverized fuel burners 2, Bailey stud tube fluid cooled furnace walls and roof 4 and 5 respectively, a fluid cooled floor of the type shown in Figs. 1ª and 7, for each primary furnace, and a fluid cooled partition wall 6 extending also along one wall of a downflow gas pass M. The partition wall 6, at its upper end, defines an opening 8 from an upper side wall of the furnace to the downflow gas pass M. The opposite wall 9 of the downflow gas pass M is also water cooled as shown.

As heretofore stated the features above noted are common to all types illustrated; it is also the fact that all of the convection surface is in small tubes closely spaced and in a single upflow gas pass N.

While natural circulation, or a combination of natural and forced circulation may be used in this invention, each of the steam generators herein illustrated and to be described is of the pump circulation type in that there is, referring to Fig. 11, which is schematic and diagrammatic, a feed pump A and a circulating pump B, there being no dependence upon natural circulation to keep the tubes of the steam generating section wet. The boilers therefore might be said to have no economizer in the ordinarily accepted sense of the meaning of a water economizer, they may be operated at pressures approaching, or even at critical pressure, though they also are operable and useful at lower pressures, but being particularly well suited, however, for very high pressures.

Referring to Fig. 11 it is to be noted also that in common with other pump circulation boilers the boiler of this invention has a separator C, and the tubes in which steam is generated are supplied with more water than they can evaporate, the excess being removed at the separator C and returned by the circulating pump B which operates entirely independent of the feed pump A. The forced circulation system, however, of these boilers distinguishes from previous forced circulation boilers in that the feed pump water is mixed with a large amount of excess water from the separator C, and yet the mixture delivered to the inlet of pump B is always at a temperature below saturation, thus assisting operation of the pump. The mixed water from the circulating pump is delivered directly to water tubes exposed to the furnace, and all of the water entering the system is passed through these tubes, the quantity of water and the tube surface being such that no steam is formed in these tubes which in Fig. 11 are indicated at D, but actually, of course, constitute the roof of the primary furnace 1.

From these tubes D constituting the furnace walls, as indicated in Fig. 11, the water, without steam, is distributed to a multiplicity of water circuits E, in each of which steam is formed, and while only two are shown diagrammatically in Fig. 11, outlets to a number of others are indicated at F. These steam generating sections E are located in zones of less heat intensity than the heat absorbing surface D. Each of these water circuits E comprises a multiplicity of tubes in parallel between an inlet and an outlet header with resistors in each tube to equalize the flow between the tubes. In addition each of these steam generating sections E is served by a control valve G, the functioning of which, by the density of the steam and water mixture passing the valve, controls the water admitted to each of the sections or units E and thus, consequently, also controls the percentage of water in the mixture leaving the sections or units E, this type of control valve being the subject of an application of applicant and Paul S. Dickey, filed July 2, 1938, Serial No. 217,316.

In Fig. 13 is illustrated a suitable form of control valve G for regulating the supply of water to each generating section E to maintain the desired density condition of the mixture of steam and water leaving said section. This result is obtained by utilizing the differential across the valve for the control of the water supply. As shown, the valve G has an inlet pipe 111 below a movable valve member 117 having guide fins 118 and seating normally on a seat 119. When the valve member 117 is moved upwardly water from the pipe 111 passes between the valve member and the seat to the pipe 112 in quantity determined by the amount of valve opening. Steam and water from the section E enters the valve G through the pipe 113 below a movable valve member 120 having guide fins 121 and adapted to seat against a seat member 122. The valve members 117 and 120 are inter-related by a push rod 123 slidable through a partition member 124. The valve members and push rod are pressed downwardly by a compression spring 125 adjustable by a screw 126. When steam is generated in the section E. the mixture of steam and water entering the valve G through the pipe 113 has a greater specific volume and lower density than the water passing through the pipes 111 and 112. For a condition of equilibrium this flow of steam and water mixture requires a greater opening between the valve member 120 and the seat 122, and thus the area of the valve member 120 is made greater than that of the valve member 117. The design of these relative areas as well as the initial scale of the spring 125 and adjustment of the screw 126 depends upon the desired density of the mixture leaving the heating circuit E through the pipe 113. The unbalanced area and the size of the ports of the two valves are arranged so that with the desired steam and water mixture entering the separator drum C substantially equal water flows are admitted to each section E. In case any one section E becomes unbalanced and tends to produce superheated steam, the volume of the discharge from that section increases and the pressure drop across the upper valve member increases, opening both valves and admitting more water to that section. Similarly the valves will close whenever there is a smaller percentage of steam in the mixture entering the separator due to the decrease in volume and pressure drop across the upper valve member.

All of the circuits or steam generating sections E discharge to a separator C. Steam from the separator C passes through a superheater H comprising banks of tubes located in the upflow pass of the hot gas system and the steam then may pass to a prime mover as indicated at I. The degree of superheating is controlled through by-pass dampers (though other means may be used) so arranged that the flow of hot gases over the superheater and over certain steam generating tubes may be varied.

Low pressure steam from the high pressure turbine I in some forms of the invention other than Fig. 1, is re-heated in tubes J forming part of the walls of a large gas space at the lower portion of the gas pass system, and from which the re-heated steam passes to a low pressure turbine K.

The proportion of water discharged with the steam to the separator C is very considerable, and if desirable, under certain conditions may be as large or greater than the weight of steam generated, but in spite of which the large amount of spillover at saturation temperature for the steam pressure is diluted by feed water to a temperature where the mixture is held below saturation on delivery to the suction of the pump B.

In the boiler shown in Fig. 1 the furnace I is surmounted by a windbox II the throat of which is provided with regulating dampers 12; this windbox receives and delivers secondary heated air for combustion from the air heater 13. Intertube burners 2 deliver pulverized coal and primary air for combustion between tubes of a multiple tube roof section 5 which is part of the water heating unit D shown in the flow diagram Fig. 11. The roof tubes 5 have their outlet ends connected by a header 14 while the tubes themselves are bent downwardly and extended to form, with the refractory carried thereby, a gas tight rear wall 9 of the down-pass M for the combustion gases from the furnace I. The lower ends of the roof tubes 5 cross the entrance to the up-pass N in spaced staggered arrangement as shown at 15, to provide a screen in advance of the convection tube banks and then terminate in an inlet header 16; all of the water leaving the circulating pump B of Fig. 11 passes through this group of tubes before reaching any other steam generating section.

The front and side walls 4 are preferably of stud tube construction and are steam generating units E; each has an inlet header 17 and an outlet header 18, the inlet headers 17 being each connected to receive water from the outlet header 14 of the roof and down-pass unit. The outlet headers 18 are each connected to discharge into the separator C. While not indicated in Fig. 1 the furnace has a water cooled floor as shown in Fig. 1ᵃ.

The partition wall 3 of the furnace is likewise studded, and its tubes are opened out with respect to each other at the upper ends, as shown at 8, to provide a top outlet from the primary furnace I to the upper end of the downflow pass M and these tubes constitute another steam generating section, a header 19 connects the lower ends of the tubes and receives water from the header 14, while the upper ends of these tubes are connected by an outlet header 20 discharging steam and water to the separator C.

The side wall tubes of the down-pass and gas turning area are in four groups, two at each side, the first originating in the inlet headers 21 and extending upwardly of the down-pass and receiving water from the outlet header 14 and discharging steam and water from their upper headers 22 to the separator C while the remaining tubes of the group are connected by an inlet header 23 at their lower ends, and also receive water from header 14, while their upper portions which form the side walls of the convection pass N are connected by a header 24 discharging steam and water to the separator C.

The back of the up-pass or convection pass N is formed by a group of tubes also acting as a steam generating section of the unit, these originating in an inlet header 25 at the throat of the ash pit opening 26, then extending across the inclined floor 27 of the gas turning zone and rising upwardly, as shown, to an outlet header 28. The inlet header 25 of this steam generating section likewise receives water from outlet header 14 of the roof tube section and, similar to the other steam generating sections E, discharges steam and water from outlet header 28 to the separator C.

The convection pass N is divided by a vertical partition wall 29, the lower portion 30 of which is of suitable heat resisting material such as a metal alloy, while its upper portion 31 may be of steel.

The convection pass N is thus divided into two parallel up-passes, in the smaller of which is another steam generating section E having a lower header 32 receiving water from outlet header 14 and an outlet header 33 discharging steam and water to the separator C.

In the larger side of the convection pass N are horizontal banks of superheating tubes 37 receiving separated steam from the separator C through the upper header 38 and discharging through the outlet header 39 to a high pressure turbine or the like. Above the convection pass N is an outlet for the gases of combustion with dampers 40 which can be operated to cause more or less of the hot gases of combustion to flow over the superheater coils for regulating superheat, that portion of the gases not flowing over the superheater coils passing over the convection steam generating section on the other side of the partition 30.

Also the down-pass M is subdivided by vertically extending cooled partition walls spaced across the width to divide the same into gas channels as indicated by 34 and having lower headers 35 and upper headers 36 (see Fig. 2), the lower headers receiving water from outlet header 14 and the upper headers discharging steam and water to the separator C.

In a boiler of this design the distance between these cooled partition walls across a boiler having a 30 foot width, for instance, is about one foot with a depth of passage M of about four feet with consequently high velocity of the gases in these channels, the result being that there is considerable convection heat transfer in addition to the heat transfer by radiation.

In the operation of the furnace and boiler the fluid flow regulation in the cooling surface is such that slag accumulating on the fluid cooled walls and partitions of the long downpass adheres and is maintained in a sticky condition, as distinguished from either free flowing or a degree of hardness having no ability to catch and retain other gas borne slag particles. With this condition of the surface of the slag deposited on these tubes there is almost an automatic regulation of the thickness of the slag layer. Also it is to be noted that the gas channels are small in extent, and their entire surfaces may be easily reached through properly provided entrances (not shown) for removing slag by any of the usual and well known means.

Figure 5:
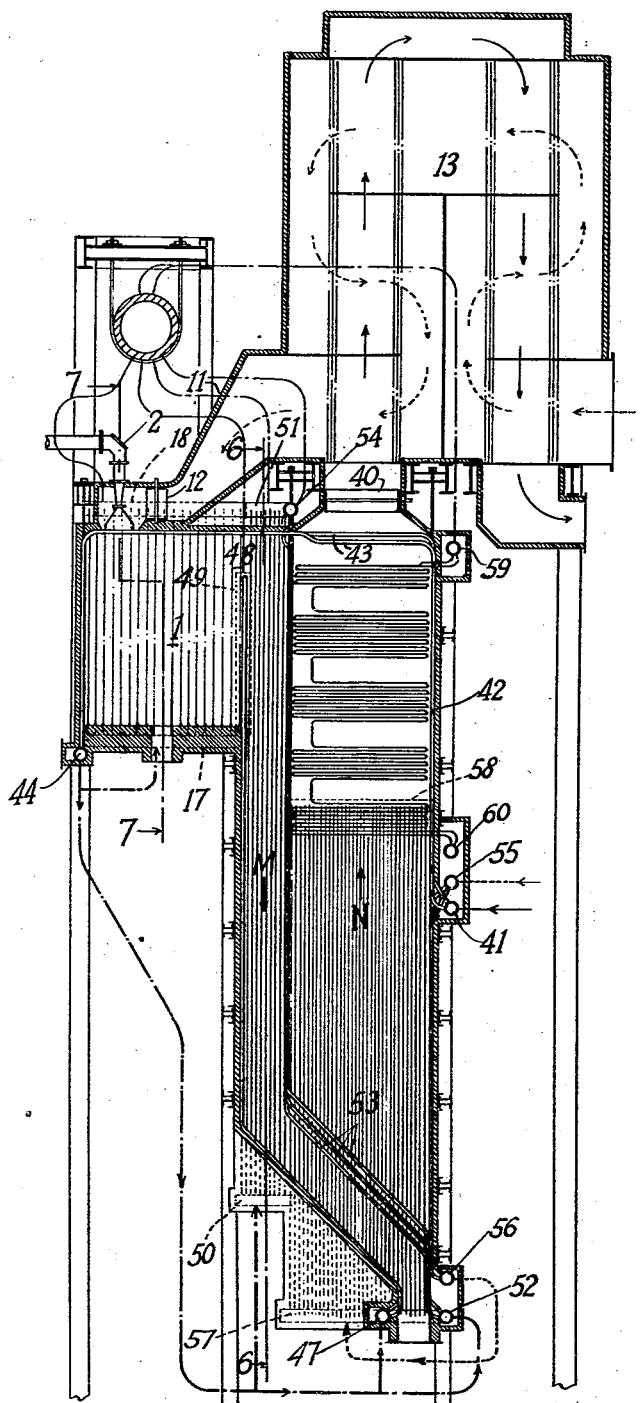
Fig. 5 is a sectional side elevation indicating the furnace gas pass and heat absorbing surface arrangement of a modified form of a steam boiler according to the present invention.
Figure 6:
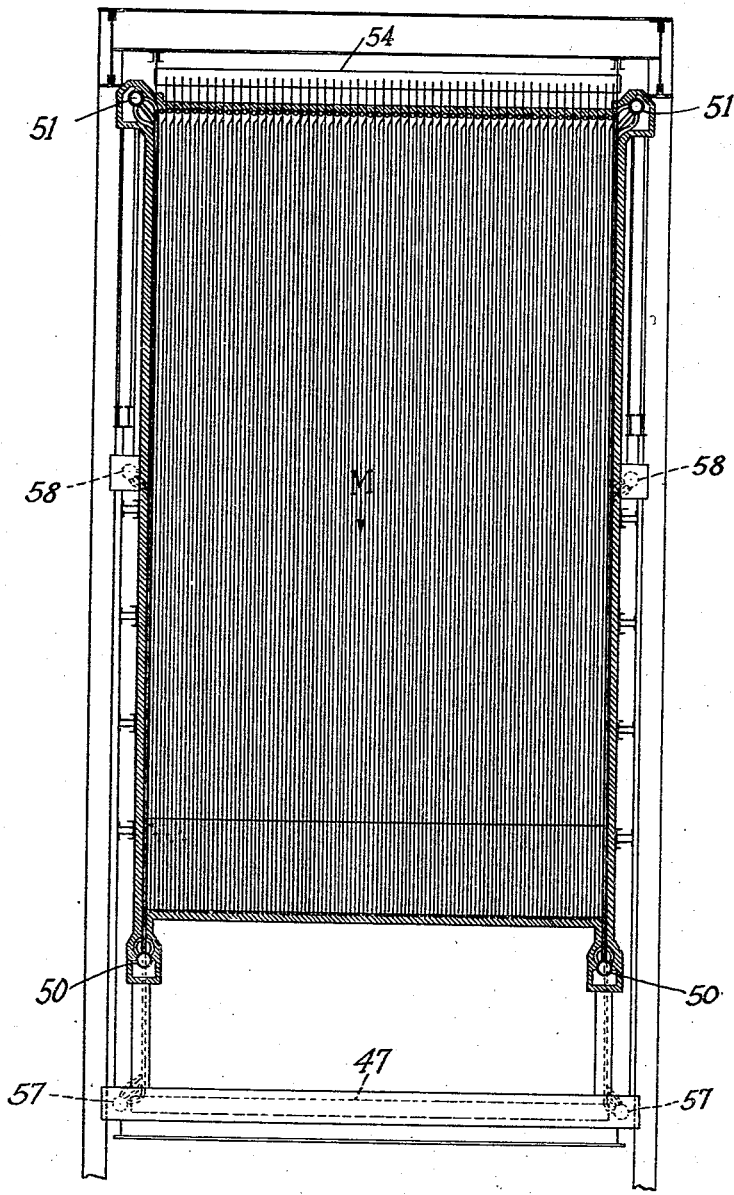
Fig. 6 is a sectional front elevation of the boiler of Fig. 5 on the plane of line 6—6.

In the boiler arrangements disclosed in Figs. 5, 8 and 10, the same fundamentals are included as in connection with Fig. 1, but in each of these modifications, there is a reheater, a difference in arrangement of heat absorbing surface and a consequent difference in sequence of working fluid flow.

However, in the description of the boilers of Figs. 5, 8 and 10, the same reference characters as used in Fig. 1 will be used for similar parts wherever possible for the sake of simplicity and clarity.

As to the modification illustrated in Fig. 5, the feed water and spillover mixture enters a main inlet header 41, passes upwardly through the tubes 42 and across the gas outlet from the convection pass N, where the tubes are arranged, as shown at 43 in open formation, to permit the passage of gases of combustion. They then resume their original close spacing to form the roof and front wall of the furnace 1 which, as in the previous form, is provided with intertube pulverized coal burners 2. In this form, however, the wind box 11, dampers 12 and air heater 13 surmount the furnace and gas passes instead of the air heater being positioned alongside thereof, as is done in Fig. 1.

The tubes 42 are provided with an outlet header 44 which acts as a main distributing header for the water, all of the incoming mixture of feed water and spillover being passed through the tubes 42 to this header.

The side walls of the furnace 1 are lined with studded water tubes divided into groups forming steam generating sections; water is delivered from the outlet header 44 to the lower inlet header 17 of the side walls and passes through the side wall tubes to the upper headers 18 which constitute the outlet of the side wall steam generating sections, and which sections discharge steam and water to the separator C.

Figure 7:
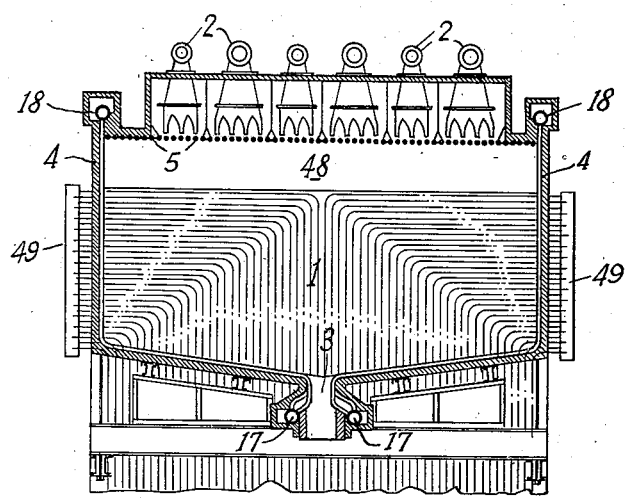
Fig. 7 is a fragmentary sectional front elevation through the furnace on the line 7—7 of Fig. 5.

The down pass M has its front wall, as well as the rear wall of the furnace 1, formed with a group of tubes, the lower inlet header of which is indicated at 47 adjacent the slag opening 26. These tubes rise upwardly on an angle, as shown, and then vertically to a height less than that of the distance to the roof of the furnace 1, thus leaving a top gas opening 48 free of tubes. These tubes are, however, fanned out, as shown in Fig. 7, to side headers 49 and the steam generating sections thus indicated discharge steam and water to the separator C.

The side walls of the down-pass M have lower headers 50 and upper headers 51, between which there are side wall tubes; the lower headers 50 also receive water from the header 44 while their outlet headers 51 discharge steam and water to the separator C. The rear wall of the down pass M, which also constitutes the front wall of the up-pass N, has a lower inlet header 52 adjacent the ash pit opening 26 and these upwardly extending tubes are opened out, as indicated at 53, and cross the gas pass and then extend upwardly to form the wall and terminate in an upper outlet header 54 discharging steam and water to the separator C, the lower inlet header being connected to the header 44 for its water supply. The foregoing delineates the arrangement of the steam generating sections E. Additionally, two side walls and the rear walls of the up-pass N are lined with tubes which form a reheater section. The inlet to the reheater is at a header indicated at 55, the tubes from which extend downwardly along the rear wall of the convection pass and terminate in a header 56 which is connected to lower headers 57 of groups of tubes which extend along the side walls of the lower portion of the convection gas pass. These side wall groups of tubes terminate in outlet headers 58 which discharge reheated steam to a low pressure prime mover, such as a turbine, as shown in Fig. 11.

Figure 4:
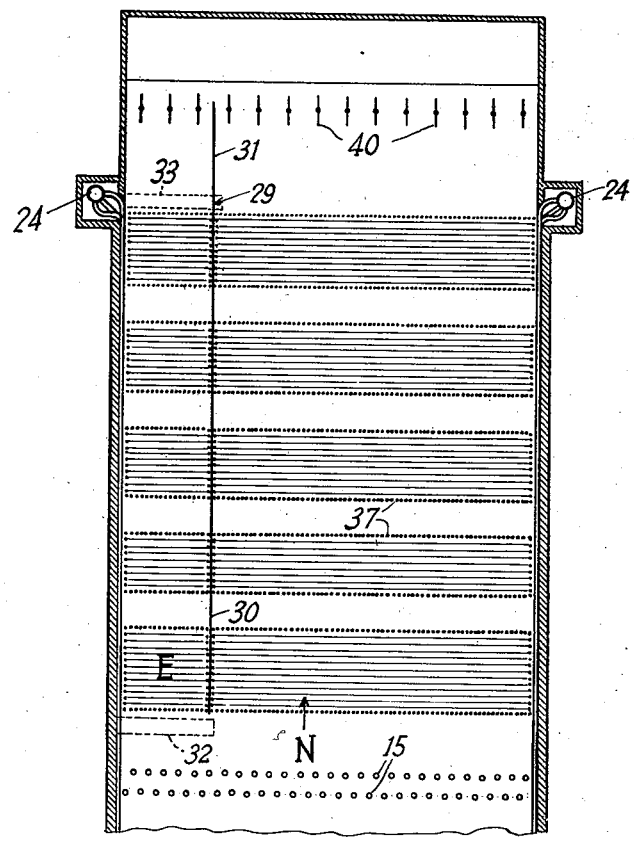
Fig. 4 is a sectional view on the plane of the line 4—4 of Fig. 1.

As in connection with the form of the invention shown in Fig. 1, the upper portion of the convection gas pass is divided in two parts by an alloy plate, as shown in Fig. 4, and on the side of greater gas flow area there is located convection superheating surface consisting of banks of closely spaced tubes which are served by the inlet header 59 receiving steam from the separator C and discharging superheated steam at the outlet header 60, while on the smaller side of the convection gas pass N is steam generating surface having an inlet header receiving a mixture of feed water and spillover from the header 44 and discharging from its outlet header a mixture of steam and water to the separator C. Also, as is the case in Fig. 1, dampers control the amount of hot gases flowing over the superheating surface and over the steam generating surface so as to regulate superheat.

Fig. 8 is similar to Fig. 1, with the exception that it also is modified by the inclusion of a reheater. In the modification shown in this figure, the mixture of feed and spillover water enters an upper header 61, travels down through tubes 62 lining the back wall of the convection pass to a pair of headers 63 connected by a nipple 64 and from which inclined tubes 65' cross the lower end of the convection gas passage in staggered separated relation to act as a screen; the tubes then rise upwardly to form the front wall of the convection gas pass and extend across the roof of the furnace 1 to a distributing header 65. From this location, incoming water is distributed to the lower headers 66 of the side walls of the primary furnace 1, the tubes of which have outlet headers 67 discharging steam and water to the separator C. The front wall and water cooled floor of the primary furnace have tubes 68 which receive their water from the distributing header 65 through the lower inlet header 69, the outlet header 70 thereof discharging steam and water to the separating drum C.

Originating at a lower header 71 adjacent the ash pit opening 26 are a group of tubes which define one edge of the opening of the secondary furnace and lie across the floor thereof and along the front wall of the down pass M, and at the location of the inner edge of the inclined floor of the primary slag tap furnace 1 are bent inwardly of the down-pass and separated to form a slag discharge opening, as shown in Fig. 8ª, then extend again upwardly vertically for a sufficient distance to form the rear wall of the primary furnace and finally are separated as shown in Fig. 12 (similar to Fig. 1), to form the outlet 8 for the hot gases of the primary furnace 1 to the downflow gas pass M, similar to Fig. 1. The tubes end in a header 72, which discharges steam and water to the separating drum C.

In the downflow pass M are wing walls 73 similar to Fig. 1, served by lower headers 74, which receive their water from the distributing header 65 and which have upper outlet headers 75 discharging steam and water to the separator C.

The slag tap opening 26 on the side opposite to the header 71 has another header 76, in which there originate tubes 77 lying along the inclined floor of the secondary furnace and which then extend upwardly to a header 78 which constitutes the inlet header of the steam reheater section, previously described header 76 being its outlet header from which steam to be reheated passes to horizontal headers 79 and side wall sections 80 having outlet headers 81 which discharge reheated steam from the high pressure turbine to a low pressure turbine, as indicated in the diagram Fig. 11.

Like Fig. 1, superheater surface and water heating surface are arranged in the divided convection pass N and need not be here described. A water tube screen 82 is, however, included in the circuit and extends all the way across both sides of the upflow pass N, having an inlet header 83 connected to receive water from the distributing header 65 and an outlet header 84 discharging steam and water to the separator.

Fig. 10 is similar to the arrangement shown in Fig. 8 except that no partition or wing walls are included in the downflow pass M and the primary furnace I has an uncooled floor inclined from side to side similar to the furnace of Figs. 1 and 5 and with a slightly different shaped secondary furnace. In view of the fact that the working fluid flow in Fig. 10 is identical with the working fluid flow of Fig. 5, it seems superfluous to again describe the arrangement of heat absorbing surface, particularly since it is indicated by connections on the drawings. A more detailed description is therefore omitted. The air heater in this construction, however, surmounts the boiler in the same manner as shown in connection with Fig. 5.

With reference to each form of the boiler, there is below the furnace I a hopper O which receives and quenches the slag through the water sprays S; the quenched slag is washed down by the jet when the gate P is open and falls through the chute R into the lower hopper T, which similarly receives ash from the opening 26 through gate U. Slide V operated by hydraulic cylinder W permits the quenched slag and ash to fall into the car X by which it is carried away.

While, in the foregoing, I have described several embodiments of the invention, it is nevertheless to be understood that in practicing the same, I may resort to such modifications as fall in the scope of the appended claims defining the invention.

I claim:

1. In combination, a boiler, a slag tap fluid cooled furnace operating above the ash fusion temperature of the fuel fired, means firing the furnace with elements of combustion including a pulverized fuel containing fusible non-combustibles, a fluid cooled down pass of substantial length directly connected to receive at its upper end the products of combustion including gas borne molten non-combustibles, and means proportioning heat absorption of the fluid cooling structure of said down pass to the heat content of the flowing gases whereby molten non-combustibles are retained on the fluid cooling surface of said down pass in a condition presenting a sticky surface for adhesion of additional gas borne material.

2. In combination, a boiler, a slag tap fluid cooled furnace operating above the ash fusion temperature of the fuel fired, means firing the furnace with elements of combustion including pulverized fuel containing fusible non-combustibles, a fluid cooled down pass of substantial length directly connected to receive at its upper end products of combustion including gas borne molten non-combustibles, said down pass having fluid cooled surface dividing the same into several channels wide enough to prevent bridging by accumulation of non-combustibles and yet of a narrow enough gas flow area to provide effective utilization of radiant heat throughout the transverse section of the flowing gas stream, and means proportioning heat absorption of the fluid cooling structure of said down pass to the heat content of the flowing gases whereby molten non-combustibles are retained on the fluid cooling surface of said down pass in a condition presenting a sticky surface for adhesion of additional gas borne material.

3. In a pulverized slag-forming fuel fired boiler, a furnace of the slagging type having a slag receiving bottom and discharge means, means firing the furnace at the top with elements of combustion and for maintaining temperatures at the ash fusion level of the fuel fired, a fluid cooled downflow pass and an upflow pass for the products of combustion, a passage from the furnace admitting hot products of combustion to the upper portion of said downflow pass, said downflow pass being of a width greater than its breadth and of a length many times greater than its breadth whereby a relatively thin layer of products of combustion with gas borne originally molten slag particles travels the length of the downflow pass during which travel some slag particles congeal to a sticky surface condition on the cooling surface of the down pass and others may be gravity and inertia removed in advance of the upflow pass, and convection surface in the upflow pass.

4. In a pulverized slag-forming fuel fired boiler, a furnace of the slagging type having a slag receiving bottom and discharge means, means firing the furnace at the top with elements of combustion and for maintaining temperatures at the ash fusion level of the fuel fired, a fluid cooled downflow pass and an upflow pass for the products of combustion, a passage from the furnace admitting hot products of combustion to the upper portion of said downflow pass, said downflow pass being of a width greater than its breadth and of a length many times greater than its breadth whereby a relatively thin layer of products of combustion with gas borne originally molten slag particles travels the length of the downflow pass during which travel some slag particles congeal in a sticky layer on the cooling surface of the down pass and others may be gravity and inertia removed in advance of the upflow pass, and convection surface in the upflow pass, said downflow pass having a large gas turning zone at the entrance to the upflow pass.

5. In a pulverized slag-forming fuel fired boiler, a furnace of the slagging type having a slag receiving bottom and discharge means, means firing the furnace at the top with elements of combustion and for maintaining temperatures at the ash fusion level of the fuel fired, a fluid cooled downflow pass and an upflow pass for the products of combustion, a passage from the furnace admitting products of combustion to the upper portion of said downflow pass, said downflow pass being of a width greater than its breadth and of a length many times greater than its breadth whereby a relatively thin layer of hot products of combustion with gas borne originally molten slag particles travels the length of the downflow pass during which travel some slag particles congeal on the cooling surface in a layer presenting a sticky surface for adhesion of other noncombustibles which are thus removed in advance of the upflow pass, and convection surface in the upflow pass, said downflow pass being unobstructed in its transverse dimension.

6. In a pulverized slag-forming fuel fired boiler, a furnace of the slagging type having a slag receiving bottom and discharge means, means firing the furnace at the top with elements of combustion and for maintaining temperatures at the ash fusion level of the fuel fired, a fluid cooled downflow pass and an upflow pass for the products of combustion, a passage from the furnace admitting products of combustion to the upper portion of said downflow pass, said downflow pass being of a width greater than its breadth and of a length many times greater than its breadth, and convection surface in the upflow pass, said downflow passage being unobstructed in its transverse dimension and divided longitudinally by heat absorbing surface into a plurality of channels.

7. In a pulverized slag-forming fuel fired boiler, a furnace of the slagging type having a slag receiving bottom and discharge means, means firing the furnace at the top with elements of combustion and for maintaining temperatures at the ash fusion level of the fuel fired, a fluid cooled downflow pass and an upflow pass for the hot products of combustion, a passage from the furnace admitting products of combustion to the upper portion of said downflow pass, said downflow pass of a width greater than the breadth and of a length many times greater than its breadth whereby a relatively thin layer of hot products of combustion with gas borne originally molten slag particles travels the length of the downflow pass during which travel the slag particles congeal and are removed in advance of the upflow pass, and convection surface in the upflow pass, the dimensions of downflow pass proportioned to readily admit clearing the same of slag throughout the extent of the fluid cooling surface.

8. A steam generator comprising a furnace chamber having a bottom constructed to receive a layer of molten slag, a slag outlet from the lower part of said furnace chamber, means for burning a slag-forming fuel in suspension in said furnace chamber at furnace temperatures above the fuel ash fusion temperature, a vertically arranged convection pass laterally spaced from said furnace chamber and having convection heated fluid heating surface positioned therein, a relatively narrow vertically elongated gas passage positioned between and serially connecting said furnace chamber and convection pass, said gas passage being of a length at least several times greater than its breadth, and transversely spaced groups of fluid heating tubes extending longitudinally of said gas passage and arranged to divide said passage into a plurality of unobstructed fluid cooled vertical gas flow channels.

9. A steam generator comprising a furnace chamber having a gas outlet in one side thereof, means for burning a finely divided ash-forming fuel in suspension in said furnace chamber, a vertically arranged convection pass laterally spaced from said furnace chamber and having convection heated fluid heating surface positioned therein, conduit means for serially connecting said furnace chamber gas outlet to the bottom of said convection pass for a heating gas flow therebetween including a relatively narrow vertically elongated downflow gas passage positioned therebetween and having a length at least several times greater than its breadth, transversely spaced groups of fluid heating tubes extending longitudinally of said downflow gas passage and arranged to divide said downflow gas passage into a plurality of unobstructed fluid cooled vertical gas flow channels, and an ash collecting space below and arranged to receive separated ash from said gas flow channels and convection pass.

10. The method of operating a boiler and a furnace combination having a long downflow gas pass with fluid cooled surfaces and receiving products of combustion from the furnace at the top which consists in firing the furnace with elements of combustion, one of which is granular fuel containing fusible non-combustibles, maintaining the furnace temperature above the fusion temperature of the non-combustibles, collecting and draining molten non-combustibles from the furnace, discharging the products of combustion with residual molten non-combustible particles through the downflow gas pass where the said molten particles lodge on the cooling surfaces, adjusting heat absorption in the downflow pass in relation to temperature of entering products of combustion to cause non-combustibles lodging on the cooling surfaces of the downflow pass to present to the flowing gases a sticky surface causing adhesion thereto of other non-combustibles.

11. The method of burning a finely divided solid fuel having slag-forming constituents which comprises burning the fuel in suspension in a furnace chamber having a slag-receiving bottom while maintaining a furnace temperature adjacent the furnace bottom above the fusion temperature of the slag-forming constituents, removing the slag-forming constituents separated in the furnace chamber in a molten condition, withdrawing the heating gases generated in the furnace chamber downwardly through a substantially unobstructed passage, cooling the heating gases while flowing downwardly mainly by radiant heat absorption to a temperature below the fusion temperature of the slag-forming constituents suspended therein, and separating and collecting cooled slag-forming constituents at the bottom of the down-flow passage.

12. The method of burning a finely divided solid fuel having slag-forming constituents which comprises burning the fuel in suspension in a downwardly directed U-shaped flame path in a furnace chamber having a slag-receiving bottom while maintaining a furnace temperature adjacent the furnace bottom above the fusion temperature of the slag-forming constituents, removing the slag-forming constituents separated in the furnace chamber in a molten condition, withdrawing the heating gases generated in the furnace chamber downwardly through a substantially unobstructed passage of substantial length and of relatively large perimeter to flow area ratio, cooling the heating gases while flowing downwardly mainly by radiant heat absorption to a temperature below the fusion temperature of the slag-forming constituents suspended therein, and separating and collecting cooled slag-forming constituents at the bottom of the downflow passage.

13. A fluid heater comprising a furnace having a heating gas outlet in one side thereof, means for burning a slag-forming fuel in said furnace and maintaining a normal mean temperature therein above the slag fusion temperature, a laterally adjoining relatively narrow vertically disposed passage having its upper end directly connected to said heating gas outlet, fluid heating surface lining the walls of said passage and arranged to define a substantially unobstructed downflow passage in which slag particles suspended in the heating gases are cooled during their passage, a gas-turning and slag-collecting chamber at the lower end of said downflow passage, a second heating gas passage opening to said chamber, and convection heated fluid heating surface arranged transversely of said second gas passage.

14. A fluid heater comprising a furnace having a heating gas outlet, means for burning a slag-forming fuel in said furnace and maintaining a normal mean temperature therein above the slag fusion temperature, a laterally adjoining relatively narrow vertically disposed passage of substantial length having its upper end directly connected to said heating gas outlet and extending downwardly a substantial distance below the bottom of said furnace and fluid heating surface therein arranged to define a substantially unobstructed downflow heating gas passage in which slag particles suspended in the heating gases are cooled during their passage, a gas turning and slag-collecting chamber at the lower end of said downflow passage, an upflow heating gas passage laterally adjoining said downflow passage and having its lower end opening to said chamber, and convection heated fluid heating surface arranged transversely of said upflow gas passage.

15. A fluid heater comprising a furnace having a heating gas outlet in the upper part of one side thereof, means in the upper part of said furnace for introducing and burning fuel in suspension in said furnace in a U-shaped flame path, a laterally adjoining relatively narrow vertically disposed passage having its upper end directly connected to said heating gas outlet, fluid heating surface lining the walls of said passage and arranged to define a substantially unobstructed downflow heating gas passage, a gas-turning chamber at the lower end of said downflow passage, an upflow heating gas passage laterally adjoining said downflow passage and having its lower end opening to said chamber, and convection heated fluid heating surface arranged transversely of said upflow gas passage.

16. A steam generator comprising a setting including a furnace chamber and a convection section spaced laterally from the furnace chamber, a substantially unobstructed vertically elongated downflow connecting passage having its upper and lower ends connected to said furnace chamber and convection section respectively, means for introducing a downwardly directed stream of pulverized fuel into said furnace chamber and burning the same in suspension therein, a row of vertical tubes defining a partition wall between said furnace chamber and downflow connecting passage, means forming a gas-turning and ash separating chamber directly below said downflow connecting passage and convection section and having an unobstructed connection with said downflow connecting passage and an inclined fluid cooled floor directly below said convection section, an ash pit at the lower end of said floor and extending along the convection section side of said partition wall, and a bank of fluid heating tubes in the path of the gases flowing through said convection section.

ERVIN G. BAILEY.